US009118581B2

(12) United States Patent
Garrett et al.

(10) Patent No.: US 9,118,581 B2
(45) Date of Patent: Aug. 25, 2015

(54) ROUTING NETWORK TRAFFIC

(71) Applicants: Owen John Garrett, Ely (GB); Ian Douglas McDowall, Cambridge (GB)

(72) Inventors: Owen John Garrett, Ely (GB); Ian Douglas McDowall, Cambridge (GB)

(73) Assignee: BROCADE COMMUNICATIONS SYSTEMS, INC., San Jose, CA (US)

(*) Notice: Subject to any disclaimer, the term of this patent is extended or adjusted under 35 U.S.C. 154(b) by 327 days.

(21) Appl. No.: 13/650,354

(22) Filed: Oct. 12, 2012

(65) Prior Publication Data
US 2013/0103854 A1 Apr. 25, 2013

(51) Int. Cl.
G06F 15/16 (2006.01)
H04L 12/707 (2013.01)
H04L 29/06 (2006.01)
H04L 29/08 (2006.01)
G06F 12/00 (2006.01)

(52) U.S. Cl.
CPC .............. *H04L 45/22* (2013.01); *H04L 29/06* (2013.01); *H04L 67/1014* (2013.01); *H04L 67/1027* (2013.01); *H04L 67/1023* (2013.01); *H04L 67/1034* (2013.01)

(58) Field of Classification Search
USPC .................. 709/203, 223–229, 250
See application file for complete search history.

(56) References Cited

U.S. PATENT DOCUMENTS

| 7,414,979 | B1* | 8/2008 | Jarvis ............................ 370/238 |
| 7,536,693 | B1 | 5/2009 | Manczak et al. |
| 2002/0040402 | A1* | 4/2002 | Levy-Abegnoli et al. ..... 709/229 |
| 2004/0039820 | A1 | 2/2004 | Colby et al. |
| 2006/0164974 | A1* | 7/2006 | Ramalho et al. ............... 370/219 |
| 2010/0318679 | A1* | 12/2010 | LaVoie et al. .................. 709/239 |
| 2011/0026403 | A1 | 2/2011 | Shao et al. |

FOREIGN PATENT DOCUMENTS

| EP | 0865180 A2 | 9/1998 |
| EP | 1117227 A1 | 10/2001 |
| EP | 2288111 A1 | 2/2011 |

* cited by examiner

*Primary Examiner* — Zarni Maung
(74) *Attorney, Agent, or Firm* — Park, Vaughan, Fleming & Dowler LLP

(57) ABSTRACT

A traffic manager (121-124) for, and a method of, routing network traffic to a plurality of server computers (131-138). The traffic manager includes a network interface (204) and a processor (201). The processor is configured to receive network traffic comprising a request (701, 702) from a client computer (102-105) via the network interface. The processor is configured to then identify, based on attributes of the request, a server computer that is responsible for servicing the request (a responsible server). The processor is configured to then route the request to the responsible server using the network interface.

19 Claims, 16 Drawing Sheets

ROUTING NETWORK TRAFFIC

CROSS REFERENCE TO RELATED APPLICATIONS

This application represents the first application for a patent directed towards the invention and the subject matter.

BACKGROUND OF THE INVENTION

1. Field of the Invention

The present invention relates to traffic management apparatus and a method of routing network traffic comprising requests to a plurality of server computers, and in particular the routing of requests based their attributes.

2. Description of the Related Art

The provision of data over the Internet is well established, where a client computer, possibly using a web browser, makes a request for data to be served from a server computer. In recent years, the size and bandwidth requirement of data requested by clients has increased, and on occasion demand for particular types of data, such as a highly popular web page, can be very high. Consequently, it is necessary for similar data to be served from a plurality of web servers in order for the demand to be satisfied.

In order to optimise the availability of server resources, it is known to provide additional functionality within a service providers network so as to route network traffic to one of a plurality of servers, a process known as load balancing. Load balancing systems are described in United Kingdom patent publication numbers 2 413 868 B and 2 414 136 B, both assigned to the present applicant. In these implementations, load balancing is provided by traffic management systems.

In addition to providing load balancing of network traffic across a plurality of servers, it is known in very high load situations to provide more than one traffic management system, each sharing the same Internet Protocol (IP) address. Such a system is described in European patent publication number 2 288 111 A, also assigned to the present applicant.

A problem associated with such implementations is encountered when one traffic manager fails, either due to a systems crash or hardware failure, for example. Certain types of connections from clients are persistent and require consistent routing of network traffic (comprising requests) to the same server. If a traffic manager responsible for routing network traffic belonging to a particular connection goes offline, then the details of which server the network traffic should be routed to are lost and may cause loss of connectivity.

BRIEF SUMMARY OF THE INVENTION

According to an aspect of the present invention, there is provided a traffic manager for routing network traffic to a plurality of server computers, wherein said traffic manager includes memory, a network interface and a processor configured to receive network traffic comprising a request from a client computer via said network interface, identify, based on attributes of said request, a server computer that is responsible for servicing said request (a responsible server), and route said request to said responsible server using said network interface.

According to another aspect of the present invention, there is provided a method of routing network traffic to a plurality of server computers using a computer, wherein said computer performs steps of receiving network traffic comprising a request from a client computer via said network interface identifying, based on attributes of said request, a server computer that is responsible for servicing said request (a responsible server), and routing said request to said responsible server.

BRIEF DESCRIPTION OF THE DRAWINGS

FIG. 13A shows responsibilities arrays stored in memory in online traffic managers;

FIG. 13B shows responsibilities arrays stored in memory in offline traffic managers;

DETAILED DESCRIPTION OF EXAMPLE EMBODIMENTS

Overview of the Invention

The following embodiment is described with respect to the transmission of network traffic over the Internet, although it should be appreciated that the techniques involved have applications in other networked environments, such as local area networks providing access to a database system for example.

FIG. 1

Figure 1:
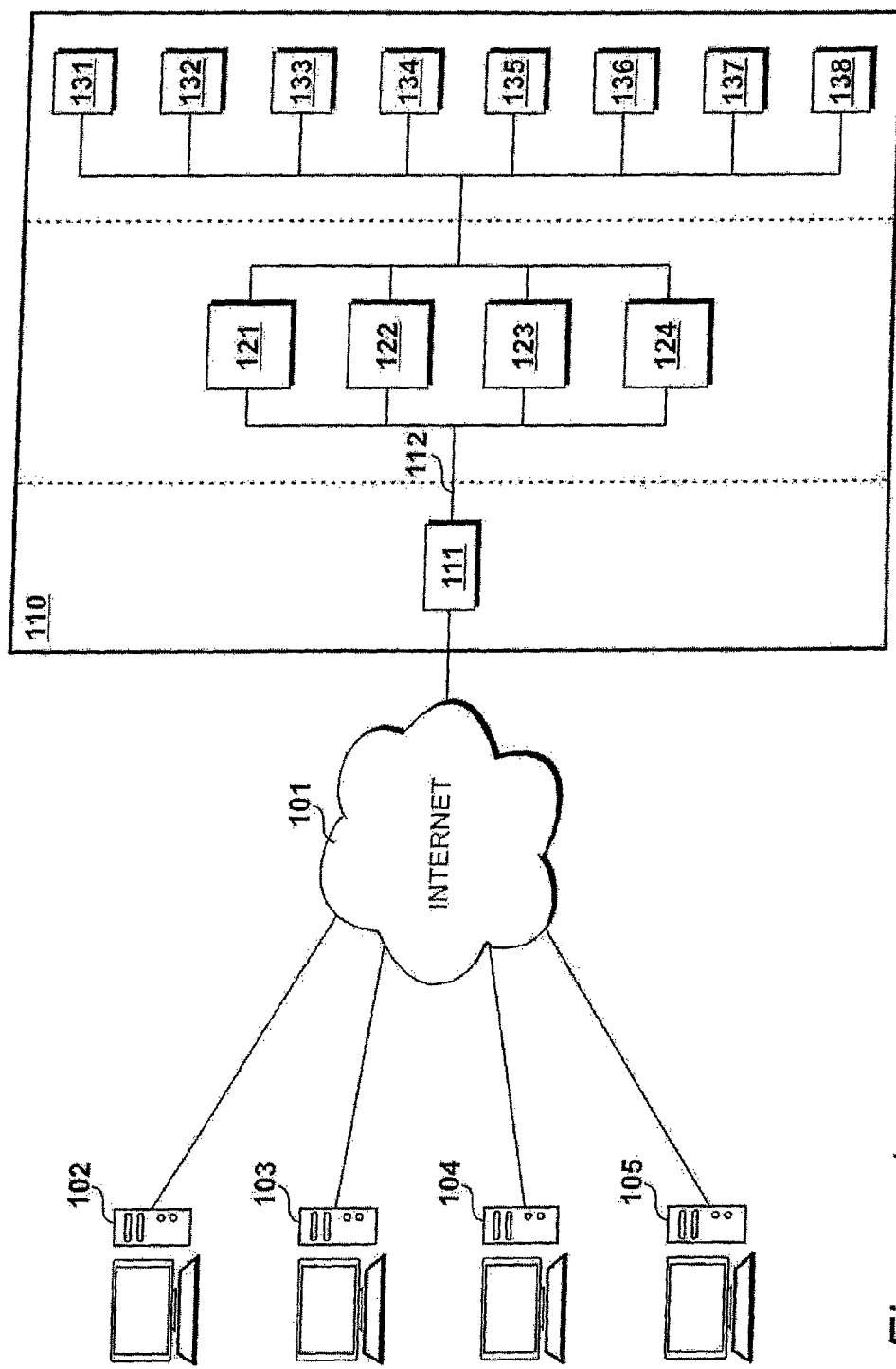
FIG. 1 shows an environment suitable for embodying the invention.

Referring first to FIG. 1, the Internet is illustrated at 101, and provides a conduit for network traffic from many client computers, a small number of which are illustrated as clients 102 to 105, to a service provider 110.

In this example, service provider 110 includes a gateway 111 that communicates with a cluster of traffic managers 121 to 124 and a pool of servers 131 to 138 over an internal network 112. The reason for the provision of a cluster of traffic managers is that service provider 110 receives such a high degree of incoming network traffic that, if only one traffic manager were to be provided, service provider 110 would not be able to provide an acceptable level of service to requesting clients. It is to be appreciated that the principle of routing of network traffic described herein is, as has been realised by the present applicant, designed to be scalable on the basis that a service provider could indeed only operate the invention with only one traffic manager routing network traffic. However, should the need arise, more traffic managers could be added to create a cluster, as illustrated in FIG. 1. In addition it should be appreciated that in most implementations, many more servers would be provided than those shown in FIG. 1, but for ease of illustration only eight are shown.

In this example, service provider 110 is associated with a single unique resource locator (URL) and is configured to provide information from a popular website to a significantly large number of browsing clients. A domain name system (DNS) server located in Internet 101 associates this URL with a single IP address. When a browsing client wishes to access the website, it sends a request in the form of network traffic comprising a stream of requests to this IP address which is received by gateway 111.

In the example of FIG. 1, and due to service provider 110 operating a plurality of traffic managers arranged in a cluster, gateway 111 is configured to replicate each request of a stream to each of traffic managers 121 to 124. Thus, each traffic manager then makes a decision about whether or not it is responsible for routing a request based upon the request's attributes. Only one traffic manager is responsible for each request, and that traffic manager routes it to one server; every other traffic manager drops the request without acknowledging it By ensuring an even spread of responsibility across the traffic managers, the load on the traffic managers is distributed evenly. The way in which this process is carried out will be described further with, reference to FIGS. 12 to 14.

Of course, in the situation described previously wherein a service provider only operates one traffic manager due to a low incoming request rate, then there is no need for any decision to be made: that single traffic manager will route all incoming requests in accordance with the procedures that the invention described herein follows when routing a request to a server. In this event, the single traffic manager will simply follow the procedures which are described further with reference to FIGS. 15 and 16.

Thus, if a decision is made to route a request, a traffic manager, such as traffic manager 121, analyses attributes of the request in order to determine which one of servers 131 to 138 to route the request to. As each traffic manager is configured to make the same routing decision as the other traffic managers on requests having an identical set of attributes, there is no need for synchronisation of routing tables, for example, across each traffic manager to provide high-availability to requests that require consistent routing.

In the embodiment illustrated in FIG. 1, the routing of requests is managed in a system having many servers for serving clients in response to one address, under the supervision of a set of traffic managers, whereby each request is routed by only one traffic manager. Each of the traffic managers is configured such that firstly it intermittently transmits its availability to the other traffic managers. Secondly, it identifies a change in the availability of the other traffic managers in the set. Thirdly, it modifies its responsibilities for traffic in response to the identified change of availability. In this way, it is possible to balance incoming requests against the availability of the traffic managers.

Each traffic manager, in this embodiment, issues a multicast on a periodic basis informing the other traffic manager to the effect that the traffic manager is online. In this context, online means available for use. A traffic manager may go offline because of a crash or simply because it is overworked and does not have enough memory to issue the multicast. Failure to receive a multicast in this way identifies to the other traffic managers that availability has been lost. Each traffic manager then independently determines its responsibility for incoming requests, without resorting to centralised or synchronised information and without negotiating with the other traffic managers.

In addition, each server issues a multicast on a periodic basis informing each traffic manager that it is online. Failure to receive a multicast from a server identifies to the traffic managers that a server's availability has been lost. Each traffic manager then independently and identically determines on a request-by-request basis which server is responsible for processing a request having particular attributes, again without resorting to centralised or synchronised information and without negotiating with the other traffic managers.

FIG. 2

Figure 2:
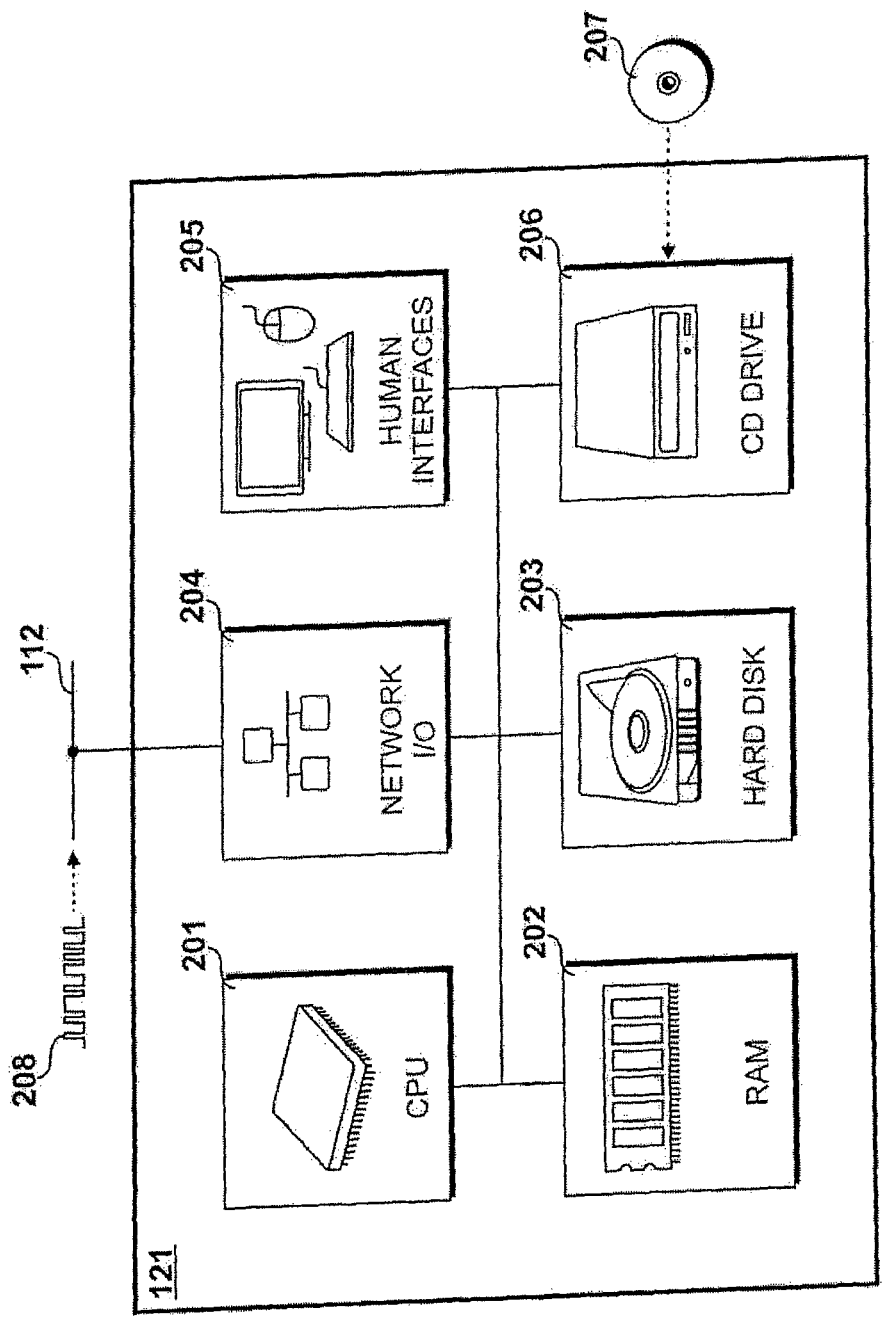
FIG. 2 shows details of the hardware configuration for a specific traffic manager.

Details of the hardware configuration for a specific traffic manager 121 is illustrated in FIG. 2. Each of traffic managers 121 to 124 is substantially the same, and each of servers 131 to 138 are similarly configured.

In order for traffic manager 121 to execute instructions, it comprises a processor such as central processing unit (CPU) 201. In this instance, CPU 201 is a single multi-core Intel® Xeon® CPU. It is possible that in other configurations the processor comprises several such CPUs to provide a high degree of parallelism in the execution of instructions.

Memory is provided by 8 gigabytes of DDR3 random access memory (RAM) 202, which allows storage of frequently-used instructions and data structures by traffic manager 121. A portion of RAM 202 is reserved as shared memory, which allows high speed inter-process communication between applications and their associated threads running on traffic manager 121.

Permanent storage is provided by a storage device such as hard disk drive 203, which in this instance is a mechanical Serial Attached SCSI (SAS) hard disk drive and has a capacity of one terabyte. Hard disk drive 203 stores an operating system and application data. Alternatively, the storage device could be a solid state drive to provide higher performance. As will be appreciated by those skilled in the art, in alternative embodiments, a number of hard disk drives could be provided and configured as a RAID array to improve data access times and/or data redundancy.

A network interface allows traffic manager 121 to connect to and receive network traffic over internal network 112. In this example, network interface is provided by a gigabit-speed 1 Gbps Ethernet network interface 204, but could equally be a 16 Gbps fibre channel interface in cases where a larger degree of bandwidth is required. Additionally, traffic manager 121 comprises a number of human interfaces 205, including a keyboard, a mouse and a visual display unit, that allow an administrator to interact with and configure it. In alternative cases, traffic manager 121 does not include human interfaces, and an administrator to interacts with and configures it via another computer using a protocol such as secure shell (SSH).

Traffic manager 121 also comprises an optical drive, such as a CD-ROM drive 208, into which an optical disk, such as a CD-ROM 207 can be inserted. CD-ROM 207 comprises computer-readable instructions that are installed on hard disk drive 203, loaded into RAM 202 and executed by CPU 201. Alternatively, the instructions (illustrated as 208) may be transferred from a network location over internal network 121 using network interface 204.

It is to be appreciated that the above system is merely an example of a configuration of system that can fulfil the role of traffic manager 121. Any other system having a processor, memory, and a network interface could equally be used, IP Address Sharing The present applicant has recognised that the technical contribution of the invention provides a highly disruptive effect when utilised by a service provider employing the system illustrated in FIG. 1, which comprises a cluster of traffic managers that each have the same IP address. This approach is referred to as "IP address sharing", and the following description relates to an embodiment of the present invention that employs this technique.

FIG. 3

Figure 3:
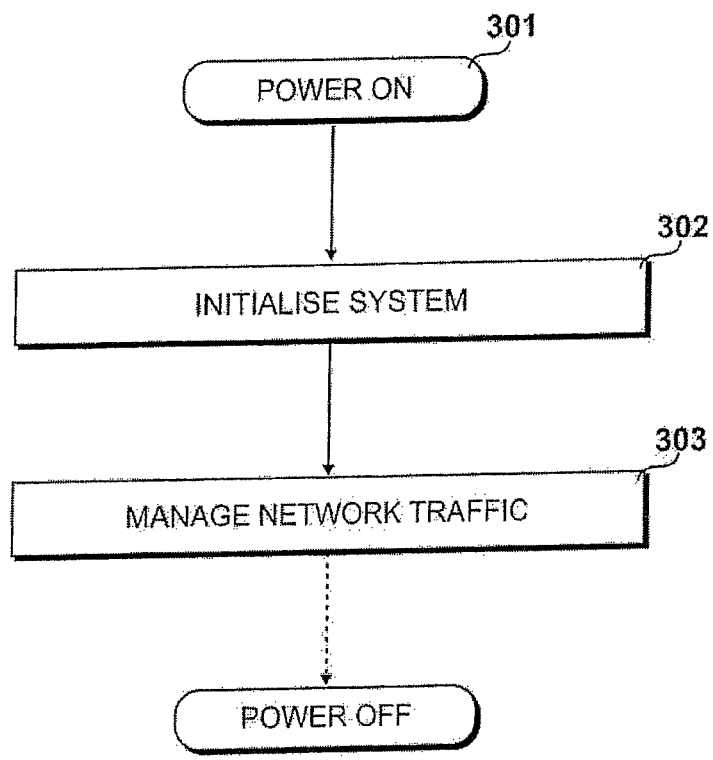
FIG. 3 shows an overview of procedures carried out by a traffic manager.

An overview of procedures carried out by a traffic manager operating in the cluster configuration previously described with reference to FIG. 1, is shown in FIG. 3.

At step 301, a traffic manager, such as traffic manager 121, is powered on, and at step 302 the system is initialised. Steps carried out during initialisation will be described further with reference to FIG. 4. At step 303, network traffic is managed; steps carried out to manage network traffic will be described further with reference to FIG. 5. Step 303 is continued until the traffic manager is powered off, either intentionally for maintenance or due to a systems crash.

FIG. 4

Figure 4:
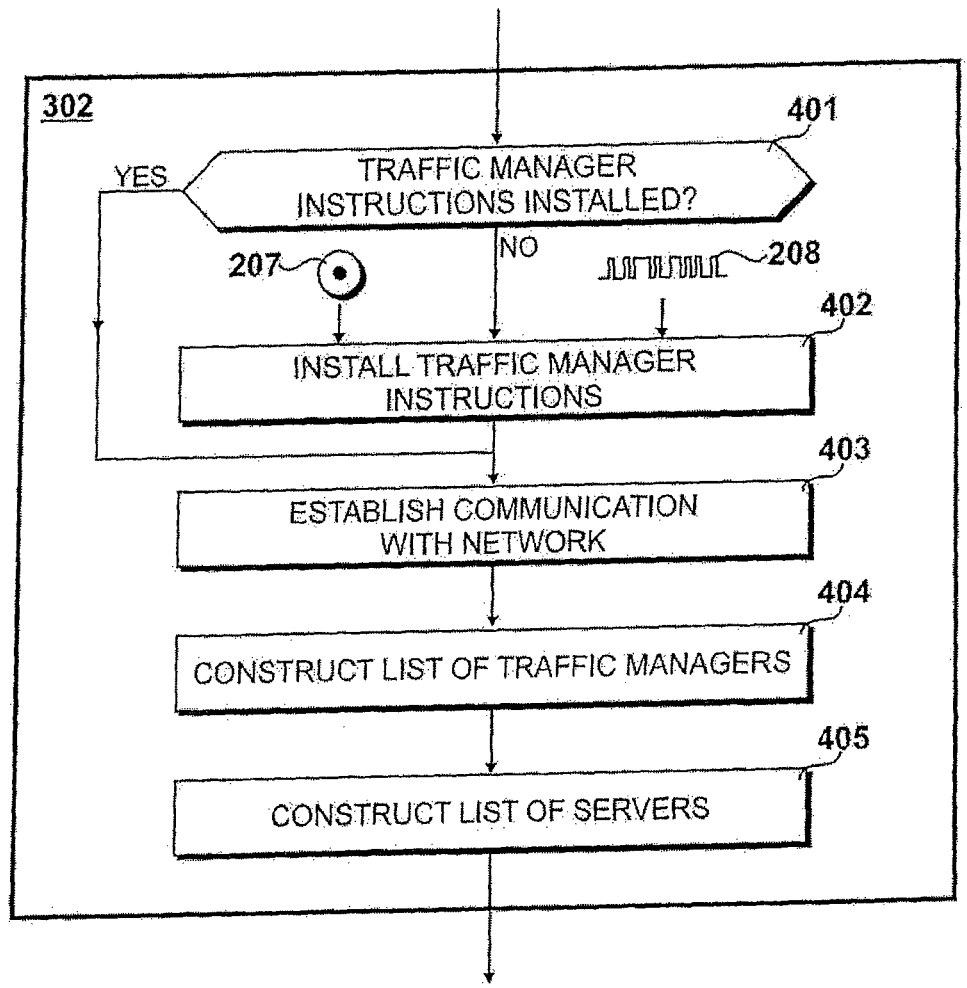
FIG. 4 shows steps carried out to initialise the system.

Steps carried out during step 302 to initialise the system are shown in FIG. 4.

At step 401, a question is asked as to whether the traffic manager instructions are installed. If the traffic manager is new on the network then this question will be answered in the negative and instructions are installed at step 402, for example from a computer-readable medium such as CD-ROM 207 or using network-sourced instructions 208 from a network location in internal network 112.

Following this, and if the question asked at step 402 is answered in the affirmative, then at step 403 traffic manager 121 establishes communication with its peers, i.e. the cluster of traffic managers further comprising traffic managers 122, 123 and 124. This includes setting up a multicast MAC address so that gateway 111 can multicast an incoming request to all the traffic managers' Media Access Control (MAC) addresses. In this step, the computer constructs a MAC address from a particular IP address, and informs gateway 111 that this MAC address should be used for multicasts of the IP address. Thus when network traffic arrives for that IP address, gateway 111 is aware of which MAC addresses to multicast it to.

Information is available from gateway 111 regarding the total number of active traffic managers on the network and the total number of active servers on the network. Thus, at steps 404 and 405, the traffic manager constructs a list of traffic managers and a list of servers respectively. These lists are ordered, in this embodiment alphabetically, and each traffic manager holds identically ordered lists.

FIG. 5

Figure 5:
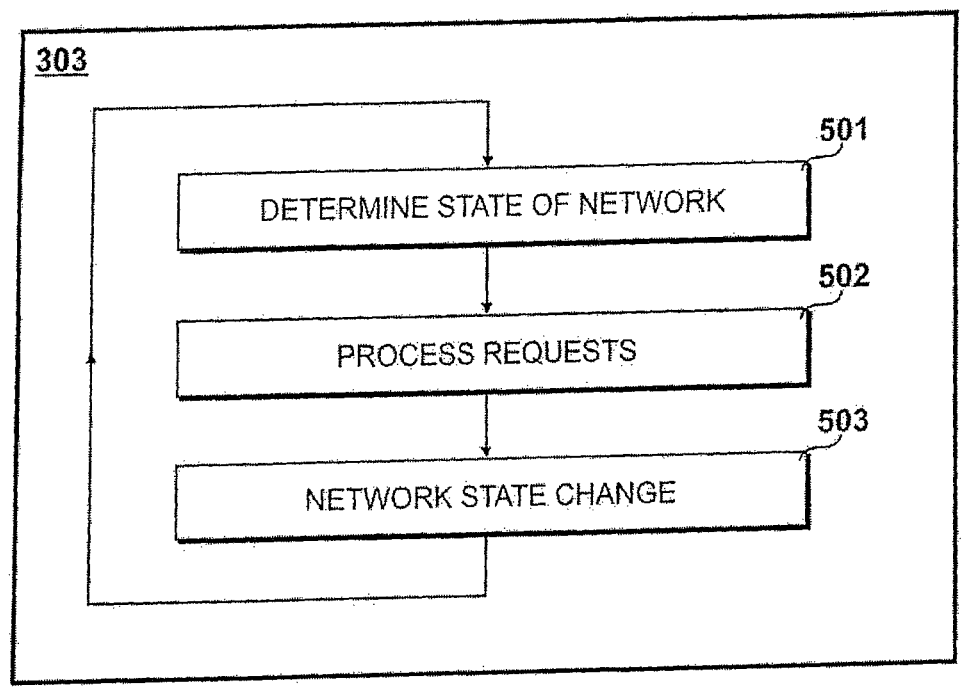
FIG. 5 shows processes carried out to mange network traffic.

Processes carried out during step 303 to manage network traffic are shown in FIG. 5.

At step 501 traffic manager 121 determines the state of the network, i.e. which traffic managers and which servers are online. This is done by listening for multicasts, sent twice a second, from the other traffic managers and from the servers indicating that they are online. Traffic manager 121 also multicasts twice a second that it is online. In this way each traffic manager is continually aware of the online availability of other traffic managers and the servers. These twice-a-second multicasts are called 'heartbeats'. In other embodiments they may be sent at a different, but regular, interval.

At step 502, traffic manager 121 processes incoming requests until a network state change, i.e. a traffic manager going offline or a server going offline, at step 503 provides an interrupt, after which control is returned to step 501 and the state of the network is determined again.

FIG. 6

Figure 6:
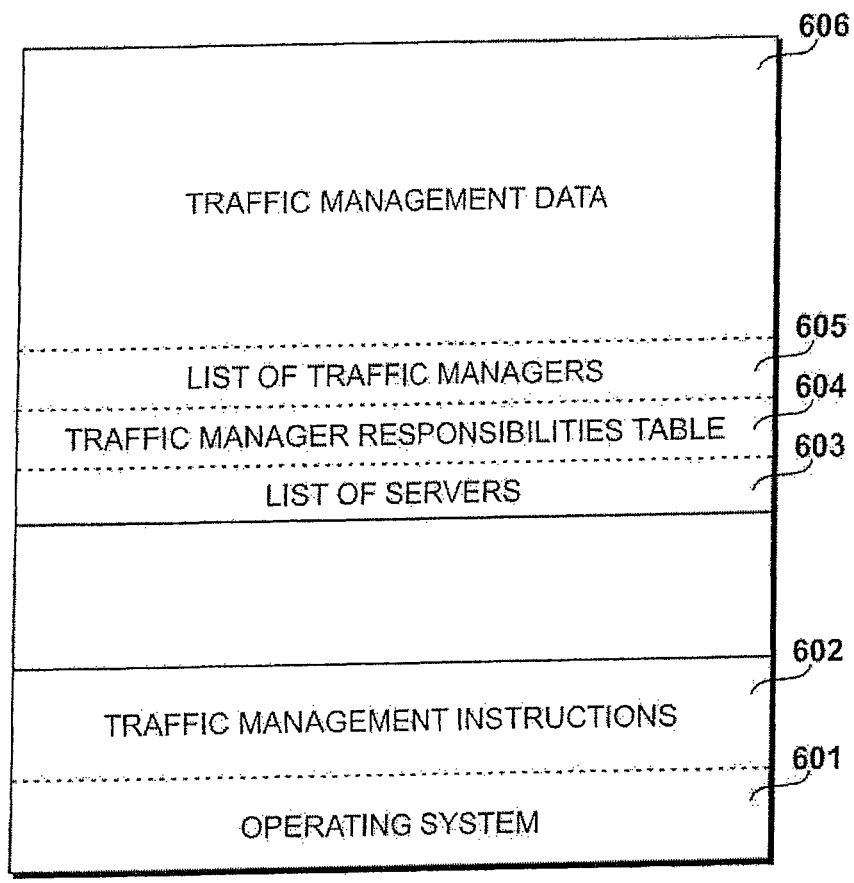
FIG. 6 shows a mapping of instructions and data held within memory of a traffic manager.

A mapping of instructions and data held within memory 202, when operational, is illustrated in FIG. 6.

As part of the initialisation process, an operating system, such as GNU/Linux® or an alternative, is held at 601. The traffic manager instructions themselves are held at 602.

A list of servers is held at location 603 having been created at step 405. A traffic manager responsibilities array is illustrated as being located at 604, the content of which will be described further with reference to FIGS. 13 and 14. The list of traffic managers created at step 404 is held at location 605, whilst location 606 provides space for the storage of further traffic management data.

Failure Scenarios

One object of the present invention is to mitigate against the failure to route requests to servers being operated by a service provider. This can arise either through the failure of a traffic manager when the invention is being employed in an environment operating a cluster of traffic managers, or the failure of a server. In the following section, the consequences of implementing some of the principles of the present invention are described with reference to FIGS. 7 to 11.

FIG. 7

Figure 7:
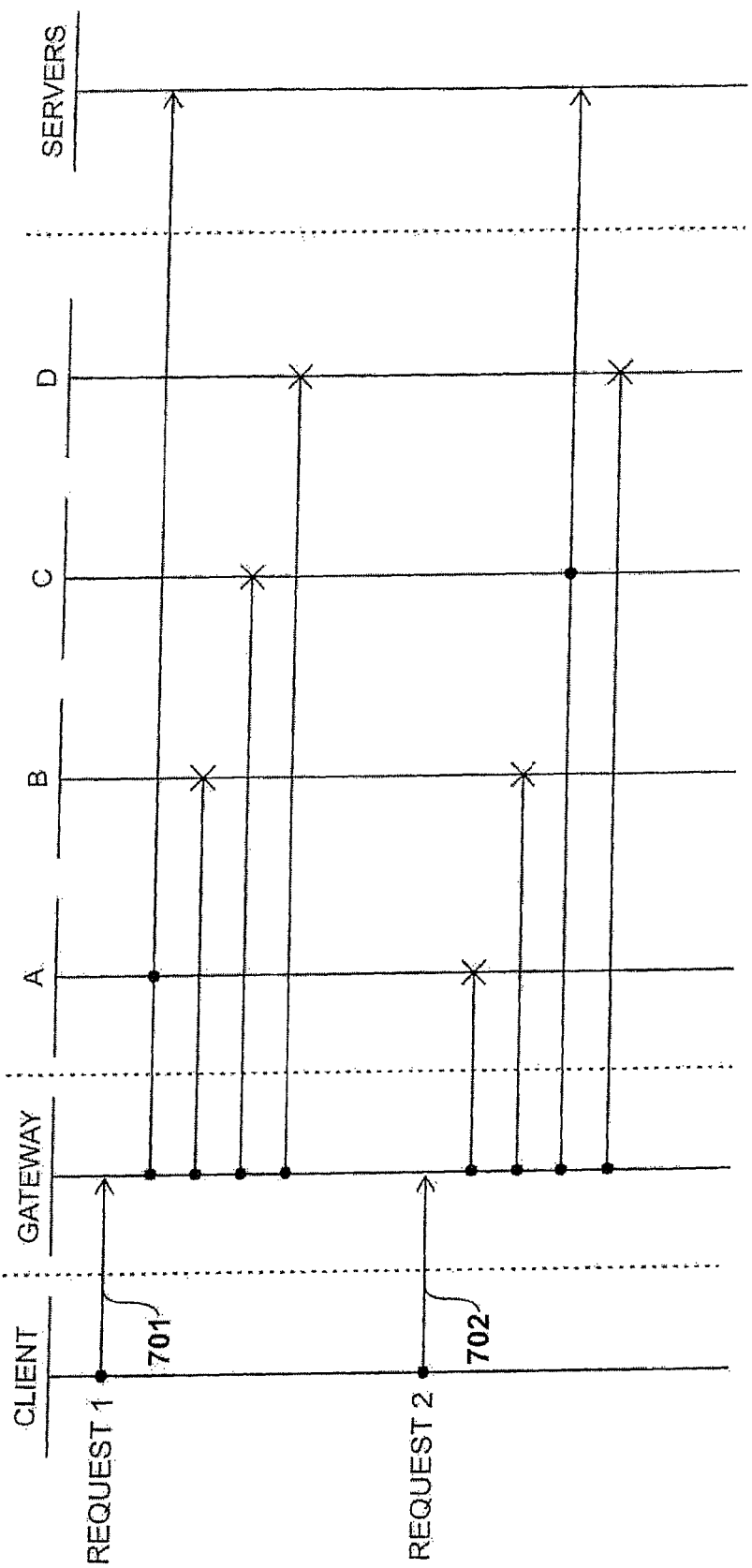
FIG. 7 shows the routing of two requests having different attributes.

An example of the routing of two requests having different attributes is illustrated in FIG. 7.

As will be apparent to those skilled in the art, network traffic transmitted over networks in accordance with the Internet Protocol suite comprises packets of data. Such packets include a header describing the packet and a payload containing the packers data. A packet's header comprises attributes pertaining to the IP version (such as IPv4 or IPv6), the source IP address and port, and the destination IP address and port, etc. Requests issued from a particular client destined for the same location will therefore comprise packets having a subset of header attributes that are always the same.

A first request 701 is shown having been issued by a first client, such as client 102, Gateway 111 receives request 701 and proceeds to replicate the request to each of traffic managers 121 to 124, labelled in this illustration as 'A', 'B', 'C' and 'D' respectively. Each traffic manager proceeds to determine, based on attributes of request 701, whether to route the request or to ignore it. Thus, in the case of request 701, the attributes result in a determination by traffic managers B, C and D that they are not responsible for routing the request, is whilst traffic manager A determines that it is. The request is then routed to a server.

A second request 702 is also shown having been issued by a second client, such as client 103. Gateway 111 receives request 702 and proceeds to replicate the request to each of traffic managers 121 to 124. The attributes of request 702 result in traffic managers A, B and D determining that they are not responsible for routing the request, whilst traffic manager C determines that it is. The request is then routed to a server.

The process of traffic managers determining, based on attributes of a request, whether to route or to ignore a request will be described further with reference to FIGS. 12 and 13, and the process of traffic managers determining, based on attributes of a request, which server to route a request to will be described further with reference to FIGS. 15 and 16.

FIG. 8

Figure 8:
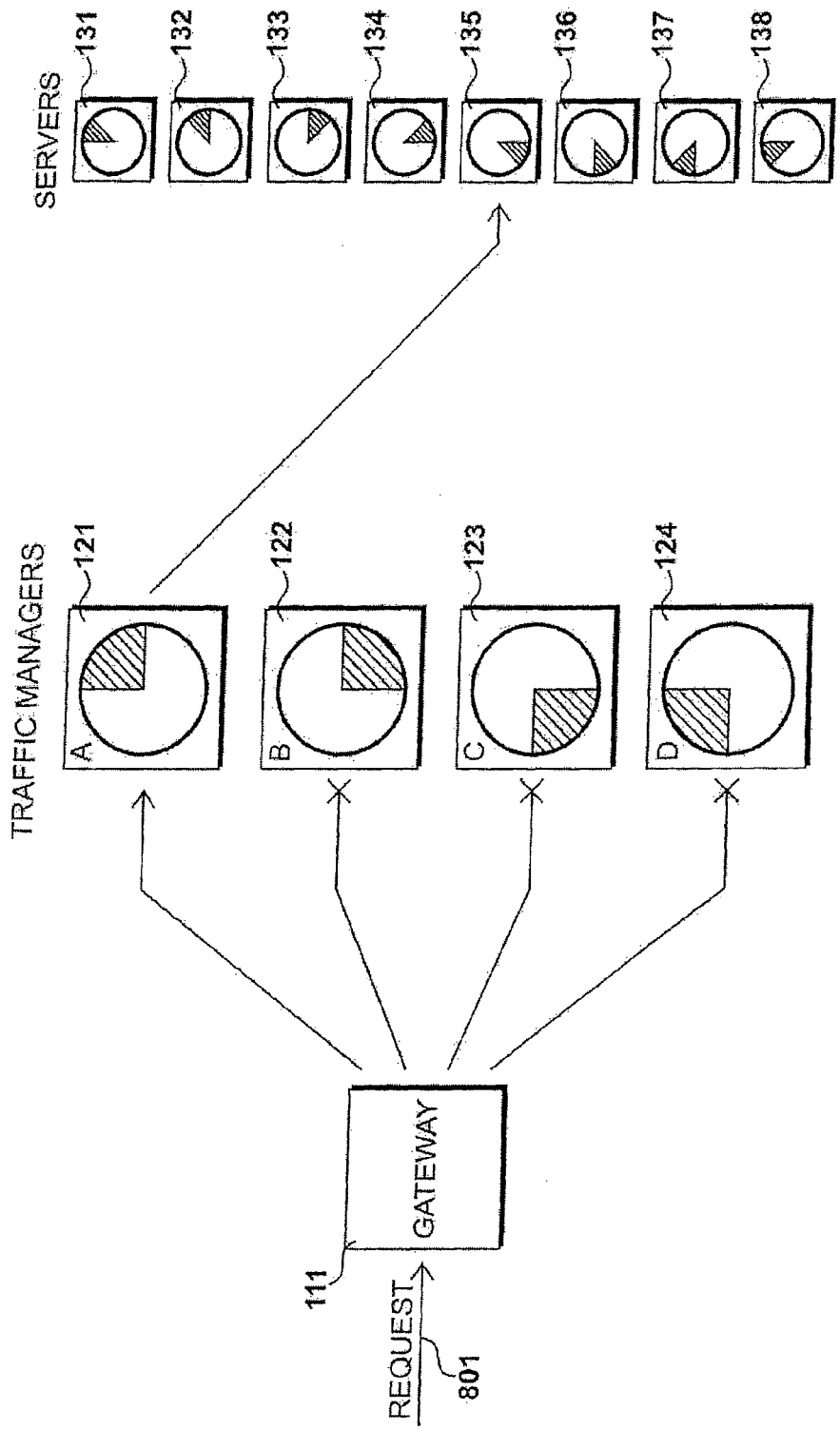
FIG. 8 illustrates the routing of a particular request.

An illustration of the routing of a particular request is shown in FIG. 8 with all traffic managers in the cluster and all servers running as normal.

If the entirety of network traffic at any one time is considered as a circle, then, as illustrated in the Figure, responsibility for network traffic is split equally between each of traffic managers 121 to 124. Thus, traffic manager 121 has responsibility for a first quarter of network traffic, traffic manager 122 has responsibility for a second quarter of network traffic, and so on. In addition, each of traffic managers 121 to 124 will determine independently and identically the responsibility for network traffic for each of servers 131 to 131. In this example, therefore, it will be determined that server 131 is responsible for a first eighth of the network traffic, server 132 is responsible for a second eighth of the network traffic, and so on.

For the purposes of illustration, the share of responsibility assigned to each server is shown in each server. It is important to note, however, that the servers do not themselves play any part in determining responsibility apart from issuing heartbeats to the traffic managers to indicate that they are online.

In the example shown in the Figure, therefore, a request 801, having similar attributes to request 701, being transmitted as part of a persistent connection is received by gateway 111, and then multicast to each traffic manager. Each traffic manager determines, based on attributes of request 801, whether to route or to ignore the request. The result of this is that traffic manager 121 (labelled 'A') determines that has responsibility for routing the request. The other traffic managers ignore the request.

Traffic manager 121 then proceeds to identify, based on attributes of the request, a server responsible for processing the request as a responsible server. Traffic manager 121 then routes the request to the responsible server, which in this case is server 135.

FIG. 9

Figure 9:
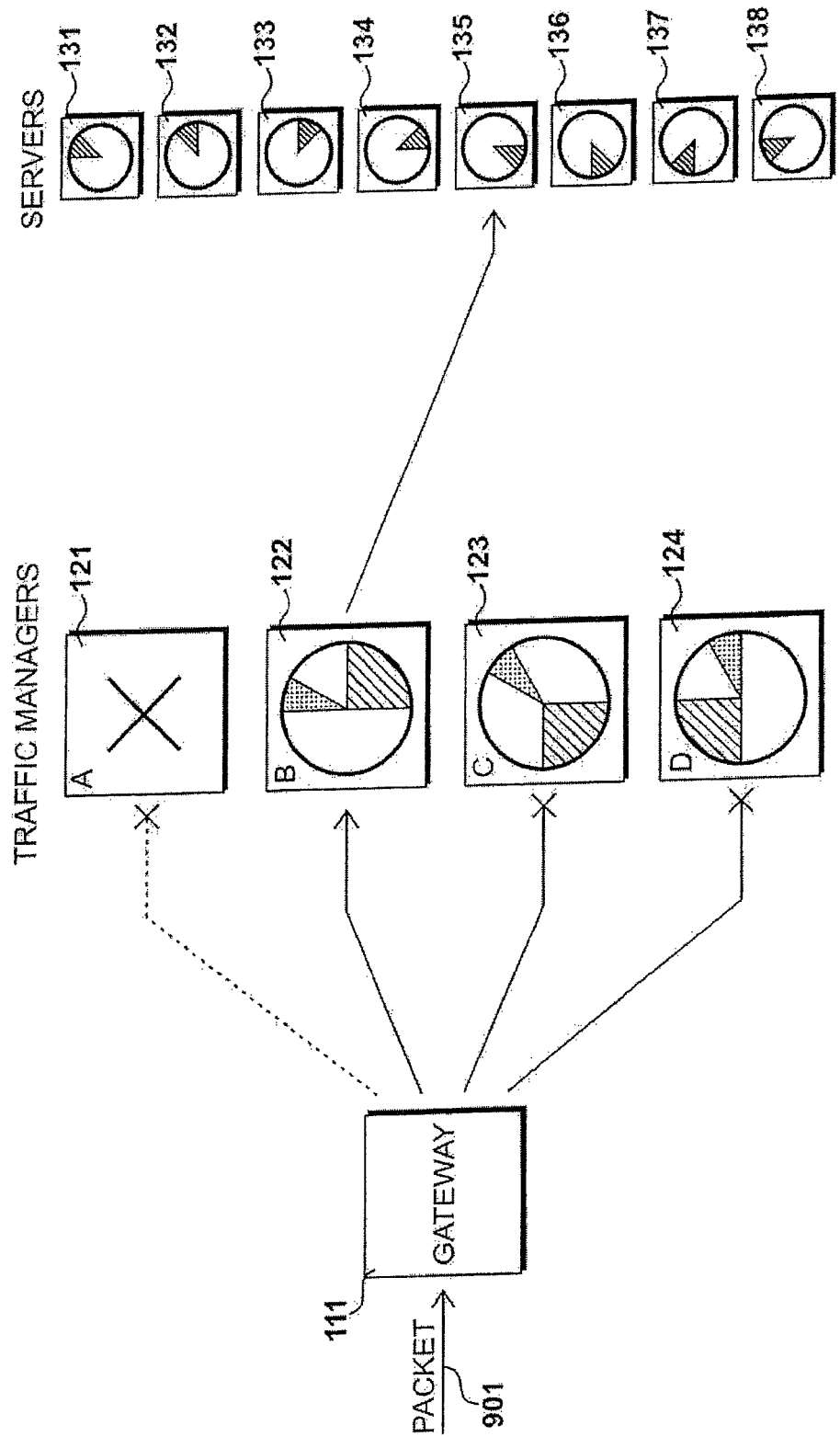
FIG. 9 illustrates the routing of a particular request in a first failure scenario.

An illustration of the routing of a particular request in a first failure scenario is shown in FIG. 9, with all servers running as normal but one traffic manager having suffered a failure.

Following the failure of traffic manager 121, each of the remaining traffic managers determined a condition to the effect that traffic manager 121 was no longer online as they did not receive its heartbeat. As shown in the Figure, each of the remaining traffic managers have assumed responsibility for a portion of to the traffic handled by traffic manager 121 without transferring any responsibility for traffic that they are already responsible for.

A request 901, belonging to the same persistent connection as, and thus having similar attributes to request 801, is received by gateway 111 and then multicast to each remaining traffic manager. It is then determined by traffic manager 122 that it is now responsible for requests having the attributes of request 901—traffic manager 121 being previously responsible for them.

As traffic manager 122 identifies which server it should route requests having the attributes of requests 801 and 901 to in an identical way to traffic manager 121, request 901 is still routed to server 135. Due to the routing algorithm described with reference to FIGS. 15 and 16, the entire operation is carried out without any negotiation between traffic managers as to responsibility for certain requests, and without any time- and bandwidth-consuming synchronisation of routing tables between the traffic managers that detail where particular requests should be sent.

Thus, if traffic manager 121 failed whilst a client was involved with a complicated database transaction with server 135, in the example shown in the Figure there would have been no discernable delay or interruption to service that could cause data corruption.

FIG. 10

Figure 10:
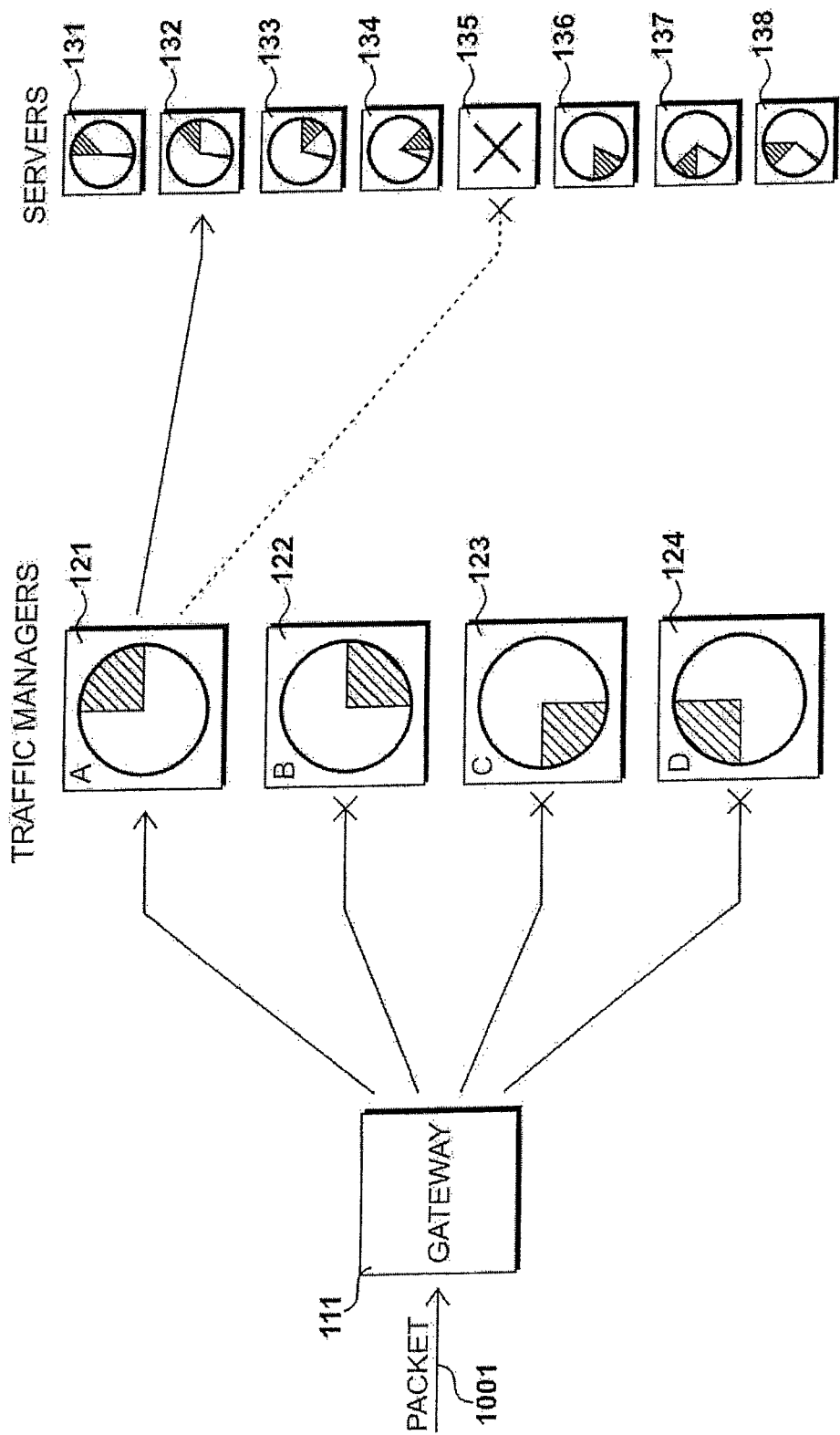
FIG. 10 illustrates the routing of a particular request in a second failure scenario.

An illustration of a second failure scenario is shown in FIG. 10, with all traffic managers functioning as normal again but a server having failed.

Whilst the present invention mitigates against failure of a traffic manager by distributing responsibility for network traffic amongst remaining network traffic, it is also used for deterministically redistributing responsibility for network traffic over servers when a server fails.

In the example shown in the Figure, traffic manager 121 has come back online and has therefore taken back its share of responsibility for routing network traffic. Thus, requests such as request 1001 belonging to the same persistent connection as requests 801 and 901 are routed by traffic manager 121, and ignored by the other traffic managers. However, in the example shown in the Figure, server 135, which had been identified by traffic manager 121 as responsible for requests having attributes similar to requests 801, 901 and 1001, has failed. Thus, the traffic managers fail to receive a heartbeat from server 135 and therefore identify it as being offline.

In a similar way to the situation described previously with reference to FIG. 9, each traffic manager independently and identically identifies which of the remaining servers should receive which proportion of network traffic that would have been routed to server 135. Thus, it can be seen that server 131 has been allocated a first seventh of the network traffic, with similar proportions allocated to the other remaining servers.

In the example shown, it is determined by traffic manager 121 that server 132 should process requests having the particular attributes of request 1001, and so request 1001 is routed there.

FIG. 11

Figure 11:
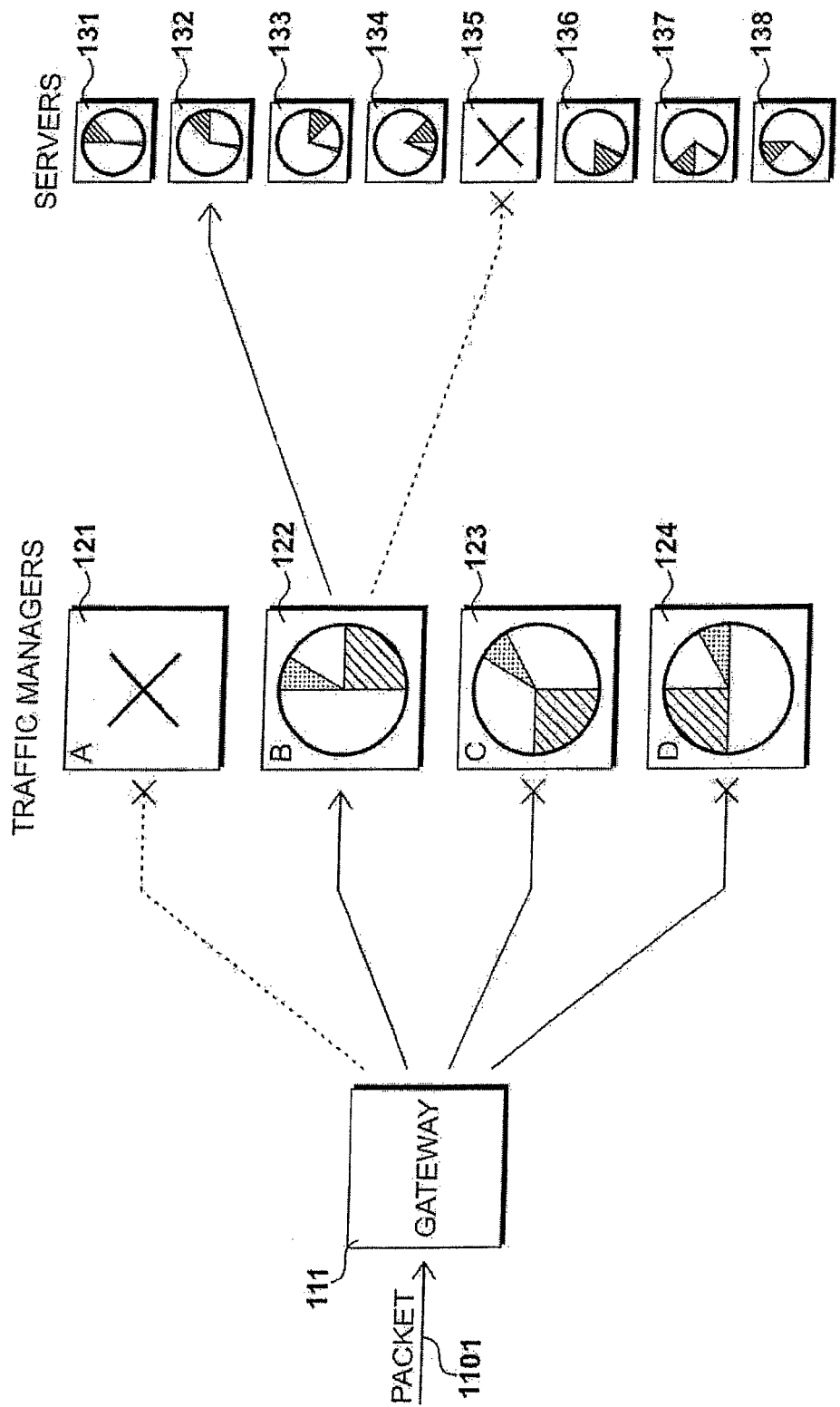
FIG. 11 illustrates the routing of a particular request in a third failure scenario.

An illustration of a third failure scenario is shown in FIG. 11, with both a traffic manager and a server having failed.

In a similar way to that as previously described with reference to FIG. 9, traffic manager 121 has failed, and, as in FIG. 10, server 135 has failed. The responsibility for network traffic previously assumed by traffic manager 121 is therefore taken by the remaining traffic managers, which also determine which servers are responsible for which portions of network traffic previously routed to server 135. Thus, a request 1101 having attributes that would have resulted in routing by traffic manager 121 is routed by traffic manager 122. The attributes of request 1101 also mean that it would have been routed to server 135, whose share of responsibility for network traffic having attributes similar to request 1101 has now been identified by the remaining traffic managers as being assigned to server 132. Traffic manager 122 therefore routes request 1101 to server 132.

Processing of Requests in IP Address Sharing

The processing of requests in a cluster of traffic managers that share an IP address will now be described.

FIG. 12

Figure 12:
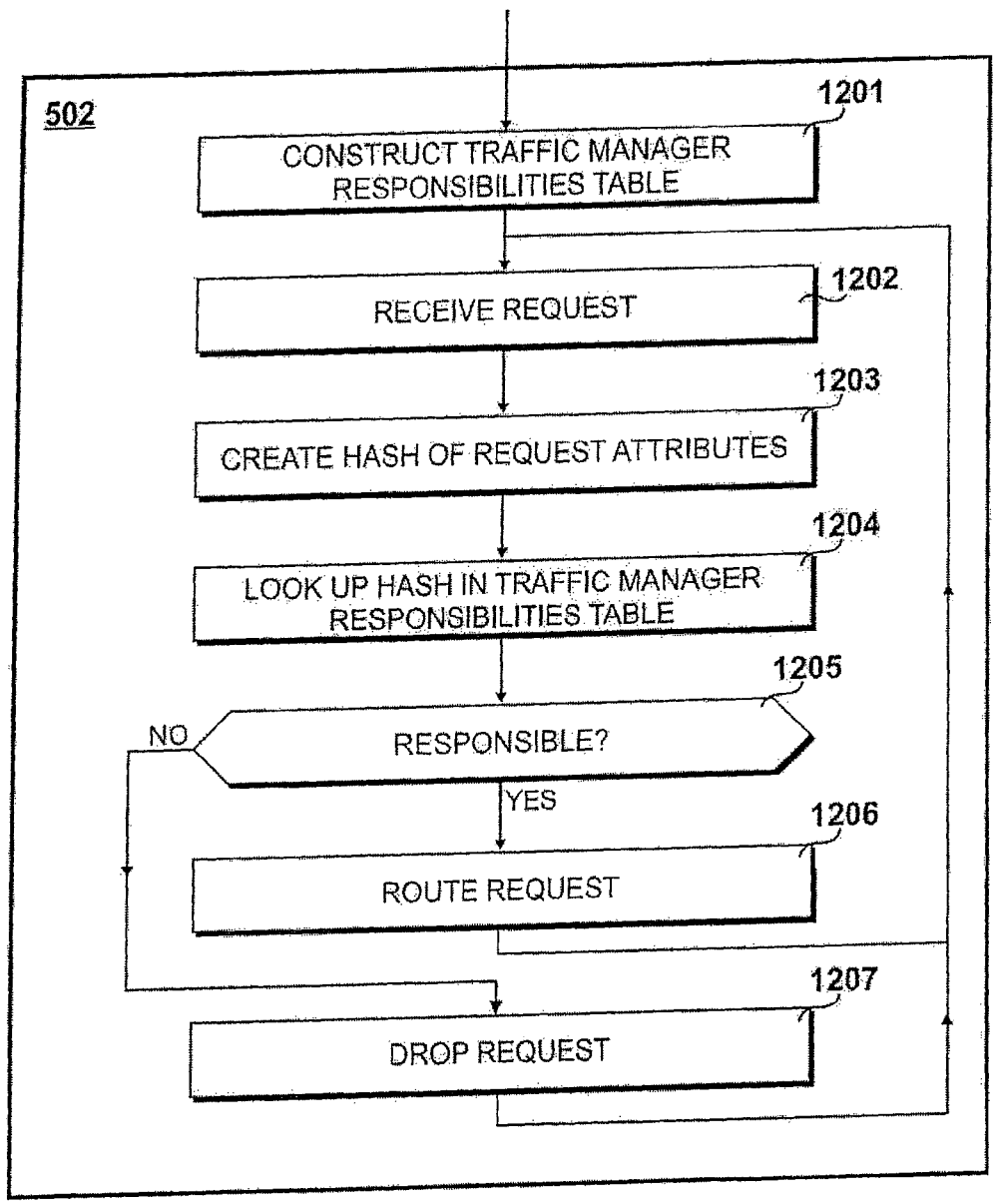
FIG. 12 shoes procedures carried out to process requests by a traffic manager.

Procedures carried out to process requests by traffic manager 121 (and identically by each of the other traffic managers in the cluster) during step 502 are detailed in FIG. 12.

At step 1201, traffic manager responsibilities array 604 is constructed, and at step 1202 a request is received from gateway 111. At step 1203 a determination is made, based on attributes of the request, as to whether to route it or to ignore it. In the present embodiment, a hash is created of the request's source IP address, and optionally the source port of the request. At step 1204 this hash is looked up in traffic manager responsibilities array 604.

At step 1205, a question is asked as to whether traffic manager 121 is responsible for routing requests having the particular hash, and if answered in the affirmative, the request it routed at step 1206. The procedures carried out to route a request will be described further with reference to FIG. 15. If the question asked at step 1205 is answered in the negative, then at step 1207 the request is dropped.

FIG. 13

Responsibilities arrays stored in memory in each traffic manager are shown in FIGS. 13A and 13B. Responsibilities arrays 1301, 1302, 1303 and 1304 are representative of the responsibilities arrays stored by each traffic manager in the case where they are all online, i.e. in similar scenarios to those described previously with reference to FIGS. 8 and 10. Responsibilities arrays 1311, 1312 and 1313 are representative of the responsibilities arrays stored by each traffic manager in the case where traffic manager 121 (having a responsibilities array labelled 'A') is offline, i.e. in similar scenarios to those described previously with reference to FIGS. 9 and 11.

The responsibilities arrays illustrated are bit arrays, each having dimension N! (N factorial), where N is the number of traffic managers in the cluster. In the present embodiment, the arrays each have 4!=24 entries. With respect to the responsibilities arrays shown in FIG. 13A, each array has six entries set as '1' and eighteen as '0'. The hash function used at step 1203 creates an integer between 0 and 23, thus splitting each incoming request into one of twenty-four 'buckets'. As shown in FIG. 13A, when online, traffic manager 121 is responsible for buckets 0, 4, 8, 12, 16 and 20.

The hash function used in this embodiment is the Jenkins Hash which reduces the IP address and the source port to an integer. This integer is then reduced to a number between 0 and N!−1 (23 in this example) using reduction modulo N!. Other hash functions could be used, and in other embodiments only the source IP address is used to make the hash. Other attributes of the request could also be hashed.

The advantage of using a hash is that it maps a wide range of values, such as the IP address, to a set number of buckets evenly and deterministically, with no statistical affinity between original values that are adjacent to each other. Thus no matter how unevenly spread requests' source IP addresses are, the hash always distributes traffic evenly over the buckets.

As shown in FIG. 13B, and described previously with reference to FIGS. 9 and 11, traffic manager 121 goes offline, as shown in the Figure by its responsibilities array being struck out. As can be seen, the buckets that it was responsible for are distributed across the remaining traffic managers evenly. Thus, in this example, traffic manager 122 (whose responsibilities array is labelled 'B') is now responsible for buckets 0 and 12, traffic manager 123 (whose responsibilities array is labelled 'C') is now responsible for buckets 4 and 16, and traffic manager 124 (whose responsibilities array is labelled 'D') is now responsible for buckets 8 and 20.

If a further traffic manager were to fail, then the eight buckets that it is responsible for would again be distributed evenly between the remaining two traffic managers. By using N! buckets, an offline traffic manager's responsibility for requests having particular attributes can always be distributed evenly between the remaining traffic managers.

FIG. 14

Figure 14:
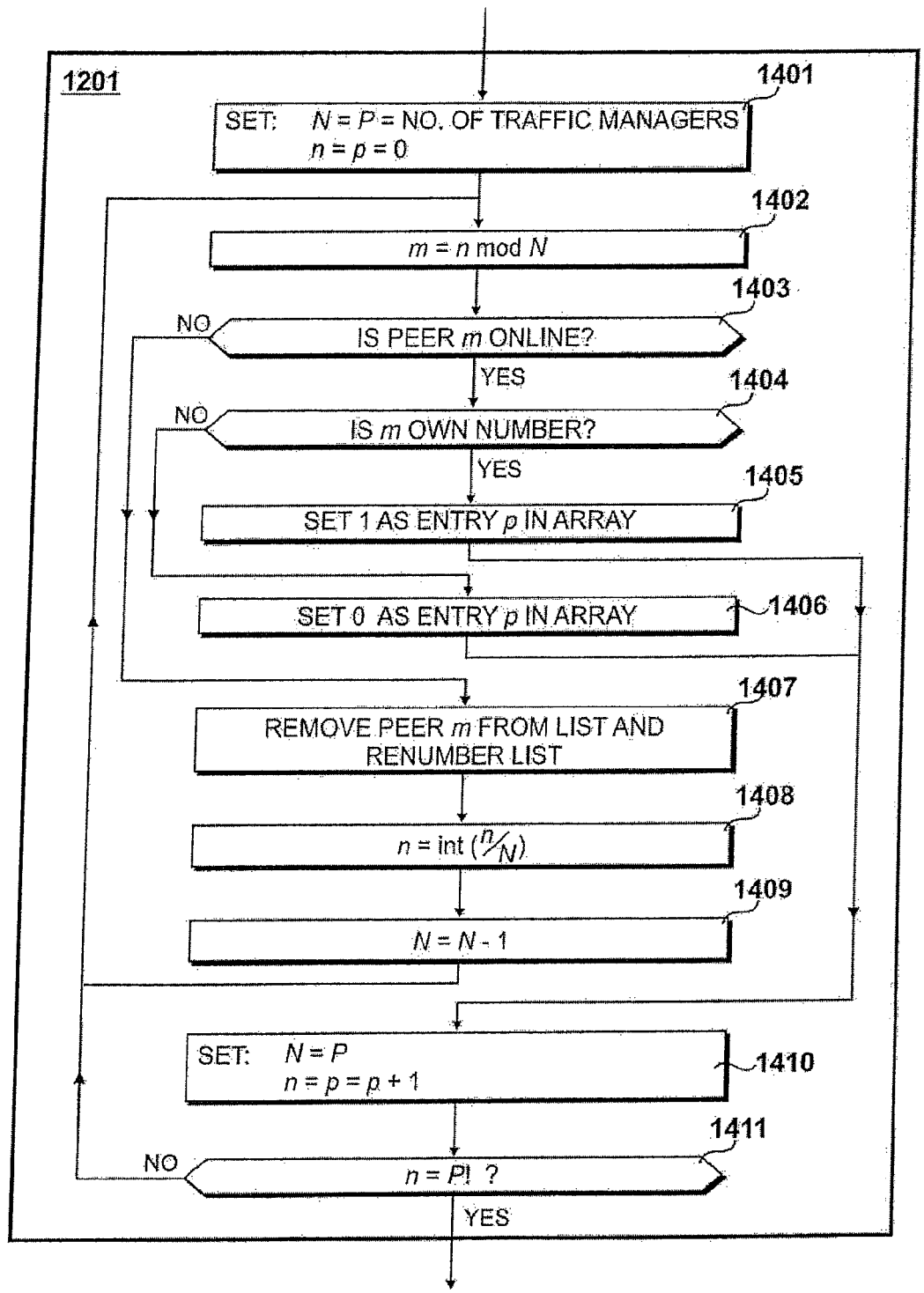
FIG. 14 shows steps carried out to create a responsibilities array.

Steps carried out at step 1201 to create responsibilities array 604 are detailed in FIG. 14.

At step 1401 a variable N and a variable P are set to be the number of traffic managers in the cluster, irrespective of how many are online, while iterative variables n and p are set to zero. At step 1402 a variable m is set to be n modulo N. At step 1403, the list of traffic managers 605 is consulted to determine which traffic manager is at position m in the list, and a question is asked as to whether this traffic manager is online.

If this question is answered in the affirmative, then a further question is asked at step 1404 as to whether this traffic manager is the traffic manager running the algorithm itself.1 If this question is answered in the affirmative, then at step 1405 the entry at position p in responsibilities array 604 is set to be 1. If it is answered in the negative then the entry is set to 0 at step 1406. Thus if all the traffic managers are online, then all the buckets with numbers that are congruent modulo N are allocated to the same traffic manager.

However, if the question asked at step 1403 is answered in the negative, to the effect that the peer with number m is offline, then at step 1407 this peer is removed from the list to create a new, renumbered list. At step 1408 the variable n is set to be the integer part of the division of n by N. This has the effect of renumbering the buckets that should be handled by the offline traffic manager from 0 to (N−1)!. Therefore, at step 1409, N is decremented by 1, and control is returned to step 1402 where a new value of m is calculated for the new values of n and N.

The new value of m is then checked against the new, renumbered list. If the traffic manager at position m indicates it is also offline, then the process is reiterated. Eventually, the bucket will be allocated to an online peer. It is important to note that the value of N will never reach zero, as for this to occur all traffic managers must be offline, and if this were to be the case then these steps would clearly not be being carried out.

Following this, at step 1410 N is reset to be P, p is incremented by one, and n is set to this new value of p. At step 1411 a question is asked as to whether n is now equal to P!. If this question is answered in the negative then control is returned to step 1402 and the process of deciding which traffic manager has responsibility for the next bucket is started. Alternatively, all the buckets have been considered and the responsibilities array has been constructed.

Further, redundant or spare traffic managers can be incorporated into the traffic management apparatus described herein. For example, a service is provider may only have enough traffic to justify running only two traffic managers at any one time, but may wish to have a further two for the purposes of reliability. It is more efficient, in terms of power and time, to only run two traffic managers in this situation and mark the other two as passive. This means that they are not considered to be online traffic managers when the responsibilities array is constructed.

The algorithm still, however, uses an initial value of four traffic managers and constructs a responsibilities array of size twenty-four. Should one of the active machines go offline, one or more of the passive machines goes online and takes its place in the algorithm.

Routing of Network Traffic

As mentioned previously, the present applicant has appreciated that the innovative principles of the routing of network traffic described herein serve particularly well in a scenario where a cluster of traffic managers is in operation, as they are complementary to the IP address sharing approach. However, the present applicant has also recognised that the innovative routing strategy will equally provide disruptive outcomes in an application where only one traffic manager is in operation, and thus does not require the use of the IP sharing mode of operation. Accordingly, the routing of network traffic will now be described.

FIG. 15

Figure 15:
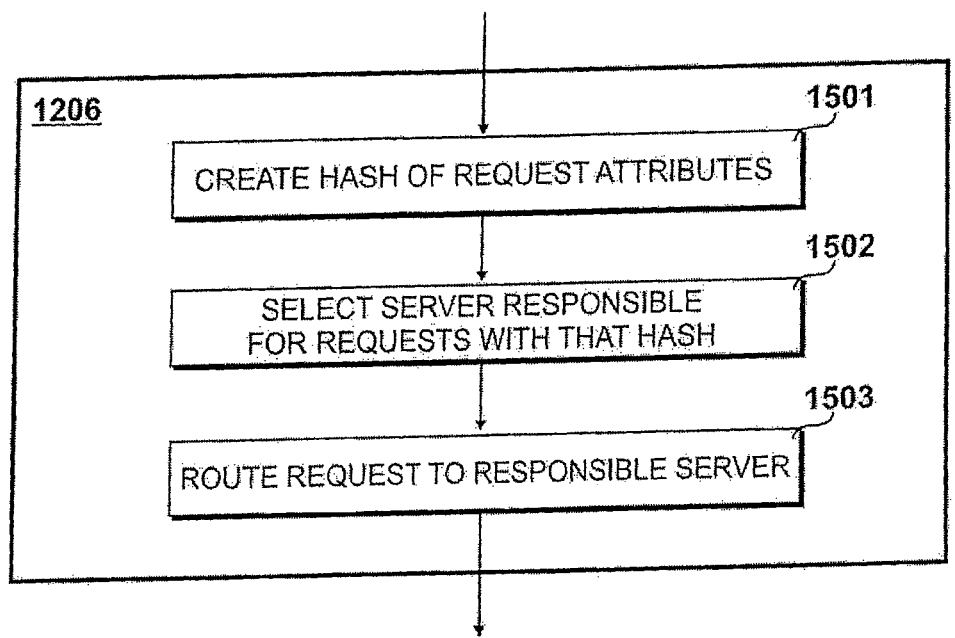
FIG. 15 shows steps carried to route a request to a server.

Steps carried during step 1206 out to route a request to a server are detailed in FIG. 15.

Following the determination at step 1205 that a traffic manager is responsible for the routing of a request, it then proceeds to identify a server that is responsible for processing the request. At step 1501, a hash is created of the request's source IP address, and optionally its source port. In a similar way to the hash created at step 1203, the hash function used in this embodiment is again the Jenkins Hash which reduces the IP address and the source port to an integer.

As the incoming requests need to be routed to one of servers 131 to 138, this integer is then reduced to a number between 0 and N!−1, with N in this case representing the number of servers. Using reduction modulo N!, in the present example the integer is therefore reduced to a number between 0 and 40319. As IPv4 addresses are 32-bit, then there is still good distribution of requests across these 'server buckets'.

At step 1502, therefore, the server currently identified as responsible for requests having the hash calculated at step 1501 is selected. This process will be described further with reference to FIG. 16. At step 1503 the request is routed to the selected (responsible) server.

FIG. 16

Figure 16:
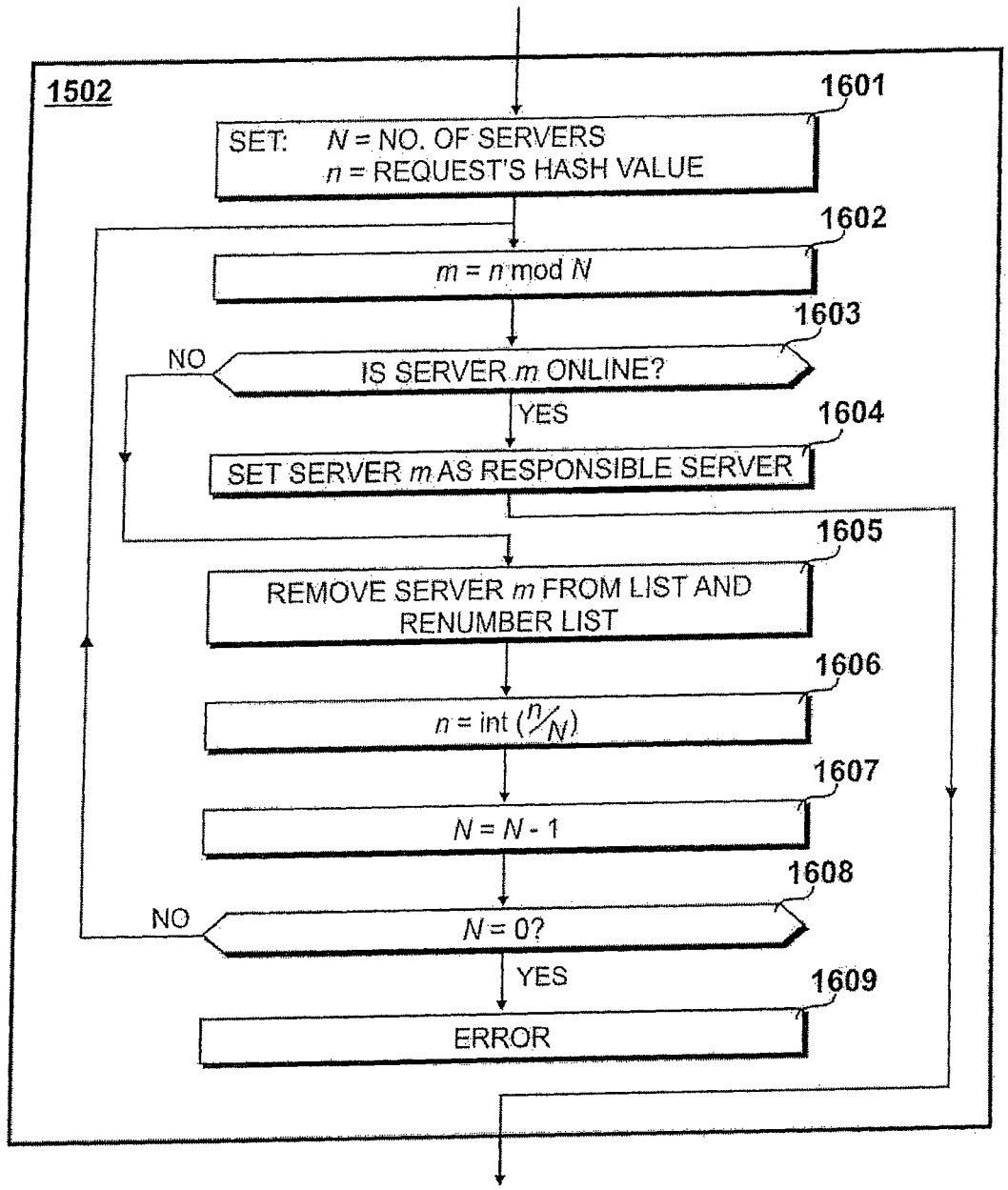
FIG. 16 shows steps carried out to select the server responsible for processing a particular request.

Steps carried out during step 1602 to select the server responsible for processing a particular request are detailed in FIG. 16.

At step 1601 a variable N and a variable P are set to be the number of servers in the network, irrespective of how many are online, while a variable n is set to be the value of the hash calculated at step 1501. At step 1602 a variable m is set to be n modulo N. At step 1603, the list of servers 603 is consulted to determine which server is at position m in the list, and the question is asked as to whether this server is online.

If this question is answered in the affirmative, then at step 1604 the server at position m in the list is set as the responsible server and step 1502 is complete. If the question asked at step 1603 is answered in the negative, to the effect that the server with number m is offline, then at step 1605 this server is removed from the list to create a new, renumbered list of servers. At step 1606 the variable n is set to be the integer part of the division of n by N. This has the effect of renumbering the server buckets whose requests would have been routed to the offline server from 0 to (N−1)!. Therefore, at step 1607, N is decremented by 1, and after checking at step 1608 that N is not equal to zero, control is returned to step 1602 where a new value of m is calculated for the new values of n and N.

The new value of m is then checked against the new, renumbered list. If it is indicated that the server at position m is also offline, then the process is reiterated. Eventually, either N will equal zero, in which case all the servers have failed and an error is thrown at step 1609, or the request will be routed to an online server.

Redundant or spare servers, marked as passive, can be incorporated into the server pool. Should one of the active machines go offline, one or more of the passive machines goes online and takes its place in the algorithm.

As will be apparent, the steps carried out are similar to those carried out when the traffic manager responsibilities arrays are constructed. However, given the large number of buckets, the algorithm for selecting a server is carried out on a hash of every request that comes in to determine responsibility on a request-by-request basis, rather than to produce a responsibilities array. This will generally be more efficient as a bit array of size N! (already large with eight servers) will become sparse and slow. A lookup tree may be the solution, but when there are many servers it becomes quicker to perform the algorithm every time.

It will be appreciated by those skilled in the art that the process of determining responsibility for requests carried out by the traffic managers is carried out independently of the process of determining which server to route the request to. In addition, each traffic manager carries out an identical process of determining which server to route a request to. Thus, if a traffic manager takes over responsibility from an offline traffic manager, it will make exactly the same routing decision as the offline traffic manager completely independently from the other traffic managers.

Due to the routing procedure described herein, there is therefore no need to resort to duplication and synchronisation of routing tables or the like across the cluster of traffic managers.

What we claim is:

1. A plurality of traffic managers for routing network traffic to a plurality of server computers, wherein each traffic manager in the plurality of traffic managers includes a network interface, and a processor configured to:
   receive network traffic comprising a request from a client computer via said network interface;
   identify, based on attributes of said request, a responsible server computer that is responsible for servicing said request, wherein said identifying is performed by each traffic manager independently of other traffic managers in the plurality of traffic managers, and
   route said request to said responsible server using said network interface, wherein said routing is performed by each traffic manager independently of other traffic managers in the plurality of traffic managers.

2. The plurality of traffic managers according to claim 1, wherein said processor is further configured to identify a server computer that is responsible for servicing said request by creating a hash of attributes of said request and determining a server computer responsible for servicing requests having that hash.

3. The plurality of traffic managers according to claim 2, wherein said processor is configured to, for any value of said hash, establish which server computer is responsible for servicing requests having that hash by:
   creating a first list of said server computers, said first list being ordered and numbered;
   calculating a first variable by taking the modulus of the hash with respect to the number of server computers in said first list;
   identifying, as an identified server, the server computer at the position in the first list indicated by said first variable;
   establishing said identified server as responsible for servicing requests having said hash.

4. The plurality of traffic managers according to claim 3, wherein said processor is further configured to:
   determine a condition to the effect that a first server computer is no longer online (an offline server); and
   allocate to each of the other server computers responsibility for processing a portion of the network traffic previously routed to said offline server, whilst maintaining each of the other server computers' existing share of responsibility for servicing network traffic.

5. The plurality of traffic managers according to claim 4, wherein said processor is configured to determine that said first server computer is offline by identifying that said identified server has not broadcast a multicast to indicate that it is online.

6. The plurality of traffic managers according to claim 5, wherein said processor is further configured to:
   determine a condition to the effect that said identified server is offline;
   remove said identified server from said first list to create a second list and numbering said second list;
   evaluate a modified hash by dividing said hash by said number of server computers in said first list; and evaluate second variable by taking the modulus of the modified hash with respect to the number of server computers in said second list;
identify, as a substitute server, the server computer at the position in the second list indicated by said second variable;
establish the substitute server as responsible for servicing requests having the unmodified hash.

7. The plurality of traffic managers according to claim 1, wherein said traffic manager forms part of a cluster further comprising at least one similar traffic manager, such that said cluster comprises a plurality of traffic managers, and wherein:
network traffic is replicated to each one of said plurality of traffic managers, and
said processor is further configured to maintain communication with said at least one traffic manager using said network interface.

8. The plurality of traffic managers according to claim 7, wherein each said processor is configured to determine whether to route or to drop said request by creating a hash of attributes of said request and determining whether it is responsible for routing requests having that hash.

9. The plurality of traffic managers according to claim 8, wherein said processor is further configured to:
establish a traffic management responsibilities array in memory by determining whether it is responsible for routing requests having each possible hash value; and
consult said traffic management responsibilities array to determine whether it is responsible for routing each request.

10. The plurality of traffic managers according to claim 7, wherein said processor is further configured to:
determine a condition to the effect that one of said plurality of traffic managers is no longer online (an offline traffic manager); and
assume responsibility for routing a portion of the traffic handled by said offline traffic manager, whilst maintaining responsibility for routing traffic that it is already responsible for.

11. A method of routing network traffic to a plurality of server computers using a plurality of traffic managers, wherein each traffic manager in the plurality of traffic managers performs steps of:
receiving network traffic comprising a request from a client computer via said network interface;
identifying, based on attributes of said request, a responsible server computer that is responsible for servicing said request, wherein said identifying is performed by each traffic manager independently of other traffic managers in the plurality of traffic managers, and
routing said request to said responsible server, wherein said routing is performed by each traffic manager independently of other traffic managers in the plurality of traffic managers.

12. The method according to claim 11, wherein said step of identifying a server computer that is responsible for servicing said request comprises creating a hash of attributes of said request and determining a server computer responsible for servicing requests having that hash.

13. The method according to claim 12, wherein for any value of said hash, said step of determining a server computer responsible for servicing requests having that hash comprises:
crating a first list of said server computers, said first list being ordered and numbered;
calculating a first variable by taking the modulus of the hash with respect to the number of server computers in said first list;
identifying, as an identified server, the server computer at the position in the first list indicated by said first variable;
establishing said identified server as responsible for servicing requests having said hash.

14. The method according to claim 13, wherein said computer further performs steps of:
determining a condition to the effect that a first server computer is no longer online (an offline server); and
allocating to each of the other server computers responsibility for processing a portion of the network traffic previously routed to said offline server, whilst maintaining each of the other server computers' existing share of responsibility for servicing network traffic.

15. The method according to claim 11, wherein said computer further performs the steps of:
determining a condition to the effect that said identified server is offline;
removing said identified server from said first list to create a second list and numbering said second list;
calculating a modified hash by dividing said hash by said number of server computers in said first list; and
calculating a second variable by taking the modulus of the modified hash with respect to the number of server computers in said second list;
identifying, as a substitute server, the server computer at the position in the second list indicated by said second variable;
establishing the substitute server as responsible for servicing requests having the unmodified hash.

16. The method according to claim 11, wherein said computer is a traffic manager forming part of a cluster further comprising at least one similar traffic manager, such that said cluster comprises a plurality of traffic managers, and wherein:
network traffic is replicated to each one of said plurality of traffic managers, and
said computer maintains communication with said at least one traffic manager.

17. The method according to claim 16, wherein said traffic manager performs further steps of:
determining a condition to the effect that one of said plurality of traffic managers is no longer online (an offline traffic manager); and
assuming responsibility for routing a portion of the traffic handled by said offline traffic manager, whilst maintaining responsibility for routing traffic that it is already responsible for.

18. The method according to claim 11, wherein said traffic manager performs further steps of:
establishing a traffic management responsibilities array in memory by determining whether it is responsible for routing requests having each possible hash value; and
consulting said traffic management responsibilities array to determine whether it is responsible for routing each request.

19. A non-transitory computer-readable storage medium storing instructions that, when executed by a computer, cause the computer to perform a method of routing network traffic to a plurality of server computers using a plurality of traffic managers, wherein each traffic manager in the plurality of traffic managers performs steps of:
receiving network traffic comprising a request from a client computer via said network interface;

identifying, based on attributes of said request, a responsible server computer that is responsible for servicing said request, wherein said identifying is performed by each traffic manager independently of other traffic managers in the plurality of traffic managers, and routing said request to said responsible server, wherein said routing is performed by each traffic manager independently of other traffic managers in the plurality of traffic managers.

\* \* \* \* \*